United States Patent [19]

Wellard

[11] 3,803,528

[45] Apr. 9, 1974

[54] HERMETICALLY SEALED ELECTRICAL RESISTOR COMPONENT

[75] Inventor: Charles L. Wellard, Cape May, N.J.

[73] Assignee: American Components, Inc., Conshohocken, Pa.

[22] Filed: June 29, 1972

[21] Appl. No.: 267,639

[52] U.S. Cl. .................. 338/257, 338/237, 338/316, 338/332

[51] Int. Cl. .............................................. H01c 1/02

[58] Field of Search ........... 338/256, 257, 332, 237, 338/316

[56] References Cited

UNITED STATES PATENTS 3,199,058 8/1965 Cramor.............................. 338/316

*Primary Examiner*—E. A. Goldberg

[57] ABSTRACT

The present hermetically sealed electrical resistor component is composed of a ceramic sleeve in which a standard resistor component is located and which is sealed on both ends by a double cap means whereby the standard resistor is isolated from the effects of ambient humidity and temperature. The double cap means enables the present package to be ruggedized, and enables it to expand and contract in response to temperature changes.

7 Claims, 1 Drawing Figure

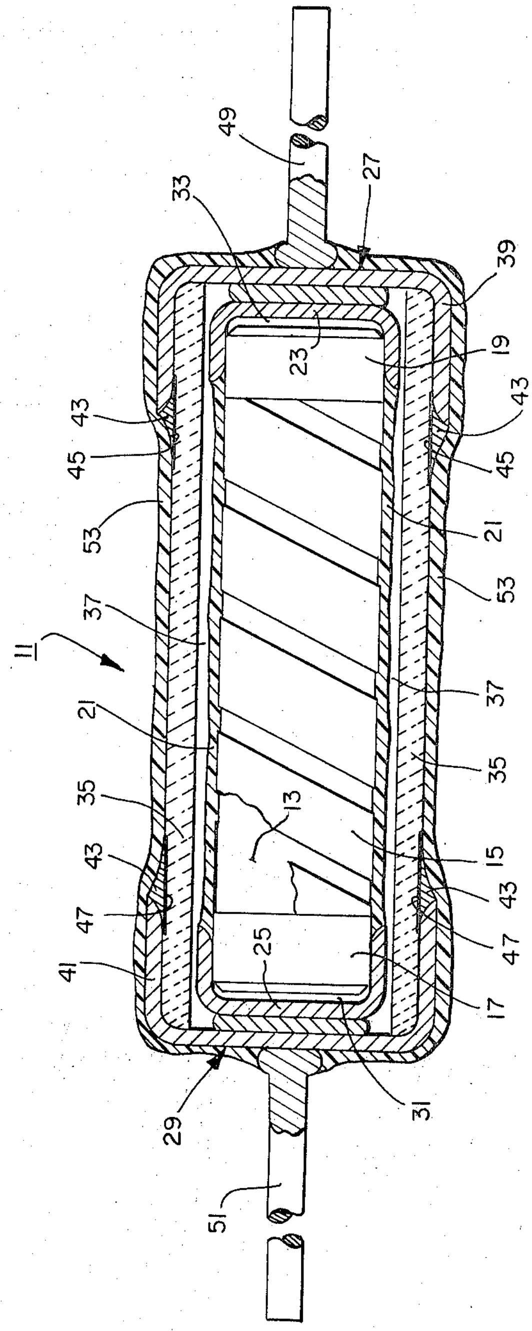
11
13
15
17
19
21
23
25
27
29
31
33
35
37
39
41
43
45
47
49
51
53

HERMETICALLY SEALED ELECTRICAL RESISTOR COMPONENT

DESCRIPTION

The present invention relates to resistor components and in particular to a resistor component which is hermetically sealed.

It is well understood that in many applications of electronic circuits, the circuit components do not operate properly because of the variations of humidity and temperature in the atmosphere which surrounds the circuitry. Such variations in temperature and humidity change the resistance values and capacitance values, etc., which, of course, lead to improper circuit performance. For instance, in a vehicle designed for flight in space, the electronic circuitry must be of a high precision nature. At the same time this high precision electronic gear is subjected to great changes in temperature and humidity and must be able to operate properly with such atmospheric changes. Accordingly, there are military specifications which set down the standards of humidity and temperature that such electronic components must meet in order to be able to be used in space vehicles.

In the prior art, it has been determined that plastic encapsulation of electronic components is not sufficient to isolate such components from the effects of temperature and humidity. For instance, an epoxy encapsulation is not sufficient to isolate an electronic component from the rigors of temperature and humidity changes, because the temperature coefficient of the epoxy, usually differs from that of the component itself and hence there are certain stresses put on the encapsulation as well as on the component when the package is subjected to temperature changes. Secondly, it has been determined that moisture will creep through an epoxy encapsulation if the component package is subjected to repeated cycles or conditions of high humidity.

In order to overcome these problems, at least two major efforts have been attempted. First it has been determined that moisture will not creep through ceramic material such as glass or steatite or the like. In one of the major prior art efforts a hollow cylindrically shaped ceramic substrate has had a thin film of metal secured or deposited on the inside surface (i.e., the surface of the hollowed out section of the cylinder) to form an electrical resistance path; i.e., to act as an electrical resistor. This has not been a standard "off the shelf" resistor but is a particular effort made to put the metal thin film material on the inside of the hollowed out section of the substrate. In addition, the caps are secured over the cylinder ends. The end caps are formed so as to be in electrical connection with the metal film path located on the inside of the hollowed out section. This device works reasonably well against the rigors of atmospheric effects but is very costly to fabricate since the deposition of the metal thin film on the inside of the hollowed out section and the spiralling thereof is a costly technique. In addition, this last mentioned procedure and the product resulting therefrom has severe limitations in that it does not lend itself to the production of a large number of different resistor sizes, and is limited to how small it can be made as a practical matter.

In the second major effort mentioned above, a standard resistor component is housed in a glass encapsulation. Since the coefficient of temperature of the standard resistor differs from the coefficient of temperature of the glass, a "bellows wire" is used to electrically connect the end of the standard resistor to the outside lead-in wire. The "bellows wire" acts as a support means to support one end of the standard resistor within the glass encapsulation and also acts as an electrical connection to the "outside world". when there are changes of temperature, the "bellows wire" either expands or contracts depending upon the temperature condition and this enables the package to withstand temperature changes with a minimum amount of stress. However, the package is not a very ruggedized package and cannot withstand, for instance, great vibrations. In addition, it is also a costly matter to fabricate this last mentioned package because of the "bellows wire" and because of the particular way in which the lead-in wires must be secured to the glass encapsulation.

The present device takes advantage of the ability of ceramic material to withstand moisture and at the same time takes advantage of using standard resistors to provide a great range of resistor values for the overall package. The present device employs a double cap end which enables the standard resistor to be readily held within a ceramic housing and yet which enables the resistor package to expand and contract with temperature changes while in addition it is characterized with a ruggedized make-up so that it can withstand great vibrations.

The objects and features of the present invention will become more meaningful hereinafter in accordance with the teaching below taken in conjunction with the drawing.

Consider the drawing in which there is depicted a standard resistor 11 surrounded by a package to seal it from the atmosphere. The standard resistor 11 is made up of a ceramic substrate 13 upon which there is deposited a metal thin film 15 which has been cut in a helical path as shown in the drawing. On the ends of the resistor component 11 are two termination bands 17 and 19 which are in electrical connection with the helical path of the metal film or the thin film of metal material 15. The termination bands are usually a film of gold metal deposited on the ends of the resistor blanks, although other metals can be employed. The termination bands are chosen because they are metals which have an affinity for the ceramic substrate and because they provide a basis for end caps to be secured to the resistor component. An "off the shelf" resistor is usually encapsulated with a protective material such as epoxy. Accordingly, in fabricating the present resistor package, the encapsulated resistor is rolled with pressure on the end caps which loosens the end caps from their bonds to the termination bands. This rolling action also shears or separates the epoxy at the end cap widths and when the end caps are removed (with their share of the epoxy thereon), this leaves the resistor component with the termination bands being naked and with the helical path of the resistor component remaining protected by the epoxy.

It should be borne in mind that the present resistor package can be fabricated by leaving the end caps on the "off the shelf" resistor attached and "as they were" and simply removing the epoxy that surrounds them.

As was just mentioned the standard electrical resistor component 11 is encapsulated in a layer of epoxy resin 21 which can be seen in the drawing. The epoxy resin encapsulation 21 is placed on the resistor in order to give the thin film of metal 15 some physical protection and serves a second purpose in the fabrication of this package, and that is to prevent oxidation of the metal which would take place when the package is heated during a soldering procedure that will be described hereinafter. As was explained above, in the illustrative embodiment, the termination bands 17 and 19 have their end caps and epoxy removed so that the inside caps 23 and 25 of the double caps 27 and 29 can come into electrical contact with the termination bands 17 and 19. The inside caps 25 and 23 are fabricated so that their inside diameter is slightly smaller than the outside diameter of the termination bands 17 and 19 and therefore when the termination bands 17 and 19 are fitted into the inside caps 25 and 23 it is a press fit and the end caps 23 and 25 are slightly dilated. It will be noted in the drawing that when the termination bands 17 and 19 are fitted to the inside caps 23 and 25 there are spaces 31 and 33 (filled with air) respectively between the end of the standard resistor 11 and the bottom of the inside caps 25 and 23. It should also be noted that the termination bands are longer (down the length of the resistor) than the inside end caps 25 and 23.

As will become apparent hereinafter when there is a temperature change affecting the hermetically sealed package, shown in the drawing, the spaces 31 and 33 enable the inside caps 23 and 25 to expand toward one another or contract away from one another in an expansion or a contraction movement. The inside caps 23 and 25 are press fitted, as stated before, over the termination bands 17 and 19 and over a portion of the epoxy encapsulation 21 so that the standard resistor is completely protected physically for the assembly and is also protected from possible oxidation which will be described later.

It can be noted in the drawing that the standard resistor 11 as well as the inner cap means 23 and 25 are fitted within a ceramic sleeve 35 whose inside diameter is greater than the outside diameter of the inner caps 23 and 25. The ceramic sleeve 35 acts to keep moisture from penetrating into the package which would result in diminishing the operating characteristics of the standard electrical resistor component 11. Very often the space 37 which is formed between the ceramic sleeve 35 and the epoxy encapsulation 21 along with the end caps, is filled with helium. It should be understood that when this space 37 is filled with an inert gas which in and of itself prevents oxidation of the standard resistor it presents further fabrication steps which add to the cost of the package. By encapsulating the standard resistor with the epoxy 21 and overlapping with the inside caps 23 and 25 it has been found that the inert gas in the space 37 is not necessary, nonetheless it is usually used to facilitate leak detection. The outer caps 39 and 41 are formed as can be seen in the drawing to fit over the ceramic sleeve 35. The outer caps 39 and 41 are secured to the ceramic sleeve by virtue of a deposit of high temperature silver solder 43. Actually the silver solder 43 is soldered to metal bands 45 and 47 which are fired noble metal bands located around the sleeve 35 and which are overlapped by the outer caps 39 and 41. The bands 45 and 47 are fabricated from fired noble metal frit formulations and provide a basis for securing the solder between the ceramic sleeve 35 and the outer caps 39 and 41. The lead wires 49 and 51 are bonded by ultrasonic welding or brazing to the double caps 27 and 29 as can be seen in the drawing.

The entire package is encapsulated in an epoxy resin encapsulation 53 to complete the solidarity of the package, and to provide overall insulation for dielectric strength.

The assembly of the present hermetically sealed package gives advantages over the prior art hermetically sealed resistor devices.

Initially it should be noted that this hermetically sealed package employs a standard electrical resistor component and therefore can be any resistance value depending upon the resistor component employed. The application of the epoxy resin layer 21 is a simple procedure that involves applying the coating to the resistive area only on working an "off the shelf" resistor as described earlier. The assembly can be performed by first inserting the standard resistor 11 with the naked termination bands into the end cap 23 with a press fit and thereafter inserting the ceramic sleeve into the outer cap 39. Next the second double cap 29 would be located such that the standard resistor 11 would be press fitted to the inner cap 25 and the ceramic sleeve 35 would be inserted into the outer cap 41. The bands 45 and 47 would have been applied over the sleeve 35 before the insertion into each of the double caps 27 and 29. Thereafter the silver solder 43 would be applied to secure the outer caps 39 and 41 respectively to the fired bands 45 and 47 and hence the package would be hermetically sealed. The lead wires 49 and 51 can be secured to the double caps either before or after the assembly with the other parts and the application of the epoxy resin 53 is a simple matter of once again applying the dielectric coating to the assembly, except the leads.

Because the ceramic sleeve 35 is employed, no moisture is able to penetrate into the package and thereby cause a failure or improper performance of the resistor 11 due to the presence of moisture. The package has the ability to expand and contract by virtue of having the double cap operate such that when there is a need for expansion the standard resistor 11 can push into the spaces 31 and 33 and simply further dilate the inner caps 25 and 23. And in the event that there is a contraction the standard resistor 11 will move to increase the spaces 31 and 33 within the inner cap. Any expansion of the ceramic material 35 simply acts to deform the double caps 27 and 29 which causes the inner caps 25 and 23 to slide one way or the other with respect to the resistor 11. However, the inner caps 23 and 25 are always in electrical contact with resistor 11. Hence the entire package does have the ability to contract and expand because of the press fit arrangement of the standard resistor within the inner caps, the flexible nature of the double caps 27 and 29, and because of the cushion or additional spaces 31 or 33 remaining therein.

The simple fabrication and the ruggedized arrangement of the present hermetically sealed resistor gives it not only a cost advantage but a performance advantage over any of the prior art hermetically sealed resistors.

Now it should be understood that while the present package was described in connection with a standard resistor having termination bands 17 and 19, it would be possible to have a resistor without termination bands. It would be possible to have some other form of standard electrical resistor such as a wire wound resistor or a carbon resistor disposed in the position shown for the standard electrical resistor component 11 but having its end portions in electrical contact with the inner caps 23 and 25. It should also be further understood that the epoxy layer 21 need not be present but some other form of protective material could be used to physically protect the electrical resistor component and even further if no protection were to be employed the space 37 could be filled with an inert gas to prevent oxidation of the electrical components which takes place during the heating of the silver solder 43 in the procedure fabricating the package.

I claim:

1. A hermetically sealed electrical resistor component package comprising in combination: an electrical resistor component means having first and second electrically conducting ends; first and second end cap means composed of electrically conducting material, each of said end cap means formed to provide an inner cap means and an outer cap means; said electrical resistor component means disposed to have a portion of its outer surface which lies close to its first end snugly fitting against the inner cap means of said first end cap means and further disposed to have a portion of its outer surface which lies close to its second end snugly fitting against the inner cap means of said second end cap means; ceramic sleeve means having first and second ends formed to fit over said respective inner cap means and within said outer cap end means, said ceramic sleeve means disposed with its first end fitting into said outer cap means of said first end cap means and with its second end fitting into said outer cap means of said second end cap means; and sealing and securing means disposed to seal and secure said respective outer cap means of said first and second end cap means with and to said ceramic sleeve means.

2. A hermetically sealed electric resistor component package according to claim 1 wherein said electrical resistor component means comprises a ceramic substrate with a metal thin film layer secured thereto and end caps secured thereon.

3. A hermetically sealed electrical resistor component package according to claim 1 wherein said electrical resistor component means is substantially encapsulated in an epoxy resin material.

4. A hermetically sealed electrical resistor component package according to claim 2 wherein said first end of said electrical resistor component means is disposed so that there is a space between it and the surface of said inner cap means lying opposite it and wherein said second end of said electrical resistor component means is disposed so that there is a space between it and the surface of said inner cap means lying opposite it.

5. A hermetically sealed electrical resistor component package according to claim 1 wherein said ceramic sleeve means is formed so that its inside diameter provides a space between the inner surface of said ceramic sleeve means and the outside diameter of said inner cap means.

6. A hermetically sealed electrical resistor component package according to claim 1 wherein said sealing and sealing means include first and second metal bands disposed around the outer surface of said ceramic sleeve means and further disposed so that a portion thereof fits under the respective outer cap means and extends beyond and further including silver solder means securing said respective outer cap means to said respective first and second band means.

7. A hermetically sealed electrical resistor component package according to claim 1 wherein there is further included epoxy resin means encapsulating said outer surface of said first and second end cap means, as well as said ceramic sleeve means lying between said securing and sealing means.

* * * * *